(12) United States Patent
Yagi et al.

(10) Patent No.: US 9,964,059 B2
(45) Date of Patent: *May 8, 2018

(54) CONTROL DEVICE FOR ENGINE

(71) Applicant: Mazda Motor Corporation, Aki-gun, Hiroshima (JP)

(72) Inventors: Atsushi Yagi, Hiroshima (JP); Kenji Sasaki, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 65 days.

This patent is subject to a terminal disclaimer.

(21) Appl. No.: 15/159,686

(22) Filed: May 19, 2016

(65) Prior Publication Data

US 2016/0341138 A1 Nov. 24, 2016

(30) Foreign Application Priority Data

May 22, 2015 (JP) .................................. 2015-104638

(51) Int. Cl.
*F02D 1/00* (2006.01)
*F02D 41/10* (2006.01)
(Continued)

(52) U.S. Cl.
CPC ............. *F02D 41/10* (2013.01); *F02D 29/02* (2013.01); *F02D 41/0225* (2013.01);
(Continued)

(58) Field of Classification Search
CPC ........ B60W 2510/0619; F02B 19/1052; F02D 2700/02; F02D 19/025; F02D 2011/103;
(Continued)

(56) References Cited

U.S. PATENT DOCUMENTS

| 5,470,289 A | 11/1995 | Pioch et al. |
| 7,291,092 B2 | 11/2007 | Tohta et al. |

(Continued)

FOREIGN PATENT DOCUMENTS

| JP | 2005155412 A | 6/2005 |
| JP | 2005301441 A | 10/2005 |

(Continued)

OTHER PUBLICATIONS

Japan Patent Office, Office Action Issued in Japanese Application No. 2015-104637, dated Feb. 3, 2017, 5 pages.

*Primary Examiner* — John Kwon
(74) *Attorney, Agent, or Firm* — Alleman Hall Creasman & Tuttle LLP

(57) ABSTRACT

A control device for an engine includes an accelerator opening detector for detecting an opening of an accelerator, a target acceleration setter for setting a target acceleration of a vehicle based on the accelerator opening detected by the accelerator opening detector, and an engine controller for adjusting an engine torque to achieve the target acceleration set by the target acceleration setter. When the accelerator opening is increased from a state where the target acceleration is set to zero, the target acceleration setter sets the target acceleration according to the accelerator opening to produce a highest jerk in the vehicle at an accelerator opening that is larger by 5 to 10% than an accelerator opening corresponding to the state where the target acceleration is set to zero.

6 Claims, 11 Drawing Sheets

(51) Int. Cl.
  *F02D 29/02* (2006.01)
  *F02D 41/02* (2006.01)
(52) U.S. Cl.
  CPC .. *F02D 2200/501* (2013.01); *F02D 2200/602* (2013.01); *F02D 2250/18* (2013.01); *F02D 2250/28* (2013.01)
(58) Field of Classification Search
  CPC .......... F02D 31/004; F02D 2009/0205; F02D 2200/0404; F02D 31/002; F02D 31/001; F02D 31/006; F02D 31/008; Y02T 10/42
  USPC ..... 701/101, 103, 104, 114; 123/319, 339.1, 123/339.14, 360, 379, 391, 403, 406.52
  See application file for complete search history.

(56) References Cited

U.S. PATENT DOCUMENTS

| | | |
|---|---|---|
| 9,073,534 B2 | 7/2015 | Okada et al. |
| 2002/0189563 A1 | 12/2002 | Muraki et al. |
| 2005/0215393 A1 | 9/2005 | Shimoda |
| 2006/0040790 A1 | 2/2006 | Tohta et al. |
| 2011/0029209 A1 | 2/2011 | Hattori et al. |
| 2011/0271788 A1 | 11/2011 | Kawai |
| 2012/0234128 A1 | 9/2012 | Ohtsubo et al. |
| 2012/0285287 A1 | 11/2012 | Sakaguchi et al. |
| 2014/0011638 A1 | 1/2014 | Iwaki |
| 2016/0258364 A1* | 9/2016 | Takeyoshi ............... F02D 11/02 |
| 2016/0258365 A1* | 9/2016 | Takeyoshi ............. F02D 11/105 |
| 2016/0273469 A1* | 9/2016 | Takeyoshi ............... F02D 41/10 |
| 2016/0339780 A1* | 11/2016 | Yagi ........................ B60K 26/02 |
| 2016/0341139 A1* | 11/2016 | Yagi ........................ F02D 41/10 |

FOREIGN PATENT DOCUMENTS

| | | |
|---|---|---|
| JP | 2005343422 A | 12/2005 |
| JP | 2006117020 A | 5/2006 |
| JP | 2006177442 | 7/2006 |
| JP | 2008239130 | 10/2008 |
| JP | WO2010086965 A1 | 7/2012 |
| JP | 5499882 B | 5/2014 |
| JP | 2015017570 A | 1/2015 |

\* cited by examiner

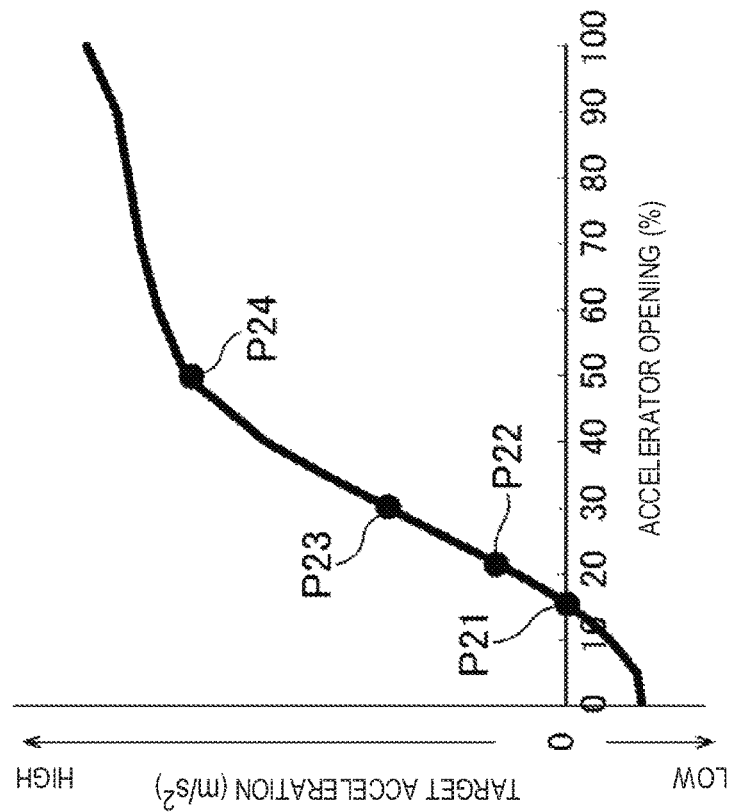
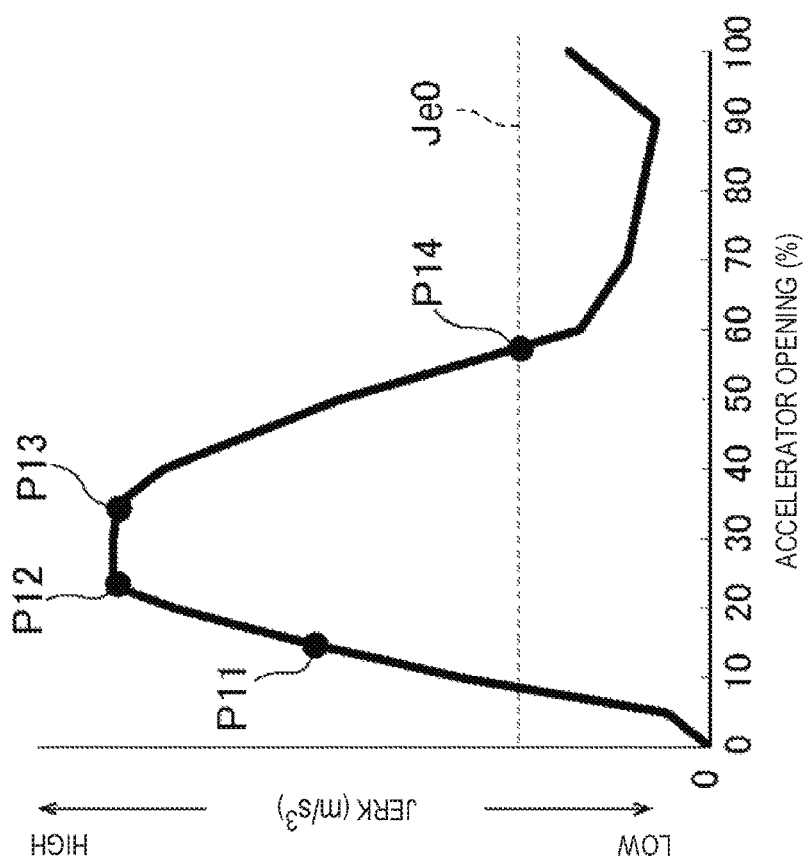
FIG. 7A
FIG. 7B

CONTROL DEVICE FOR ENGINE

BACKGROUND

The present invention relates to a control device for an engine, particularly to a control device for an engine, which controls an engine torque according to operation of an accelerator pedal performed by a driver.

Conventionally, engines of vehicles are controlled in consideration of a jerk (a rate of change (derivative value) of an acceleration per unit time, also referred to as a jolt, surge, or lurch) which is produced in the vehicles. For example, JP5499882B2 discloses an art of controlling an engine torque to maximize a jerk of a vehicle when an actual torque reaches a predetermined ratio (e.g., between 70 and 80%) with respect to a target torque which is set based on an operation amount of an accelerator pedal of the vehicle. With this art, the actual torque is greatly increased to provide a driver of the vehicle with an acceleration feel corresponding to the operation state of the accelerator pedal.

Meanwhile, a swift increase of the jerk of the vehicle to a highest value when the accelerator pedal is depressed can provide the driver with a quick acceleration feel, in other words, the driver can be provided with an impression that the vehicle has a quick response. A point (timing) at which the jerk reaches a highest value tends to leave an impression on the driver, and the driver can predict a level of acceleration of the vehicle by depending on the impression regarding that point at which the jerk reaches the highest value. Based on this, it can be said to be preferable to swiftly increase the jerk of the vehicle to the highest value when the accelerator pedal is depressed.

On the other hand, if the highest value of the jerk of the vehicle is excessively high, the jerk of the vehicle cannot be kept at a suitable value and drops after reaching the highest value, and a linear acceleration feel can no longer be secured. Moreover, the excessively high highest value of the jerk of the vehicle causes an extension of the time period required for the jerk of the vehicle to reach the highest value. Therefore, it can be preferable to configure the vehicle so that a desired jerk is produced according to an accelerator opening, and the highest jerk is produced in the vehicle when the accelerator pedal reaches a suitable opening by being depressed.

SUMMARY

The present invention is made in view of solving the problems of the conventional art described above, and aims to provide a control device for an engine, which can suitably control a jerk produced in a vehicle according to an accelerator opening so as to obtain, during acceleration of the vehicle, both of a quick acceleration feel and a linear acceleration feel.

According to one aspect of the present invention, a control device for an engine is provided. The control device includes a processor configured to execute an accelerator opening detector for detecting an opening of an accelerator, a target acceleration setter for setting a target acceleration of a vehicle based on the accelerator opening detected by the accelerator opening detector, and an engine controller for adjusting an engine torque to achieve the target acceleration set by the target acceleration setter. When the accelerator opening is increased from a state where the target acceleration is set to zero, the target acceleration setter sets the target acceleration according to the accelerator opening to produce a highest jerk in the vehicle at an accelerator opening that is larger by 5 to 10% than an accelerator opening corresponding to the state where the target acceleration is set to zero.

With the above configuration, when the accelerator opening is increased from the state where the target acceleration is set to zero (i.e., during acceleration), the target acceleration is set according to the accelerator opening so that the highest jerk is produced in the vehicle at the accelerator opening that is larger by 5 to 10% than that at which the target acceleration is set to zero. Therefore, a period of time for the jerk produced in the vehicle to reach the highest value is shortened, and a quick acceleration feel can be provided to a driver, in other words, the driver can be provided with an impression that the vehicle has a quick response. In addition, the driver can be left with an impression of a point (timing) at which the highest jerk is produced, and the driver can quickly predict a level of acceleration produced in the vehicle based on this point.

The target acceleration setter may set the target acceleration according to the accelerator opening such that the jerk is substantially fixed regardless of an increase of the accelerator opening within a predetermined range of the accelerator opening and the jerk reduces as the accelerator opening increases above the predetermined range, the predetermined range exceeding an accelerator opening at which the highest jerk is produced in the vehicle.

With the above configuration, within the predetermined range of the accelerator opening exceeding the accelerator opening at which the highest jerk is produced in the vehicle, the jerk is substantially fixed regardless of the increase of the accelerator opening. Thus, a period in which the jerk is above a lowest value of jerk which the driver can generally feel can be extended and a linear acceleration feel can suitably be secured while a time range where the driver can feel the change of acceleration can be extended.

The predetermined range of the accelerator opening may be set narrower as the highest jerk produced in the vehicle is higher.

With the above configuration, a period in which the jerk is gently reduced after being kept substantially fixed can suitably be secured. In other words, the period in which the jerk is above the lowest value of jerk which the driver can generally feel can suitably be secured.

When the accelerator opening is above the predetermined range, the target acceleration setter may set the target acceleration according to the accelerator opening so that a change rate of the jerk when the jerk is reducing becomes higher as the accelerator opening increases.

With the above configuration, when the accelerator opening is above the predetermined range, the change rate (absolute value) of the jerk when reducing becomes higher as the accelerator opening increases. Therefore, compared to a case of reducing the jerk in proportion to the increase of the accelerator opening (in this case, the change rate of the jerk when reducing becomes a fixed value), the period in which the jerk is gently reduced can suitably be secured. Specifically, a long period in which the jerk is above the lowest value of jerk which the driver can generally feel can suitably be secured and, thus, the linear acceleration feel can effectively be secured.

When the accelerator opening is above the predetermined range, the target acceleration setter may set the target acceleration according to the accelerator opening so that the jerk reduces as the accelerator opening increases, based on a quadratic function defined based on the accelerator opening and the jerk.

With the above configuration, by using the quadratic function defined based on the accelerator opening and the jerk, the jerk can suitably be reduced gently as the accelerator opening increases.

According to another aspect of the present invention, a control device for an engine is provided. The control device includes a processor configured to execute an accelerator opening detector for detecting an opening of an accelerator, a target acceleration setter for setting a target acceleration of a vehicle based on the accelerator opening detected by the accelerator opening detector, and an engine controller for adjusting an engine torque to achieve the target acceleration set by the target acceleration setter. When the accelerator opening is increased from a state where the target acceleration is set to zero, the target acceleration setter sets the target acceleration according to the accelerator opening so that: a jerk increases to a predetermined highest value at a first change rate as the accelerator opening increases; the jerk is substantially fixed regardless of an increase of the accelerator opening within a predetermined range of the accelerator opening exceeding an accelerator opening at which the jerk reaches the highest value; and the jerk reduces at a second change rate as the accelerator opening increases above the predetermined range, the second change rate being lower than the first change rate.

With the above configuration, by changing the jerk as the accelerator opening increases, during acceleration of the vehicle, both of a quick acceleration feel and a linear acceleration feel can be obtained.

BRIEF DESCRIPTION OF THE DRAWINGS

FIGS. 7A and 7B are diagrams illustrating a method of determining values of predetermined points which define a mode of a jerk characteristic according to the embodiment of the present invention.

DETAILED DESCRIPTION OF EMBODIMENT

Hereinafter, a control device for an engine according to one embodiment of the present invention is described with reference to the appended drawings.

<System Configuration>

Figure 1:
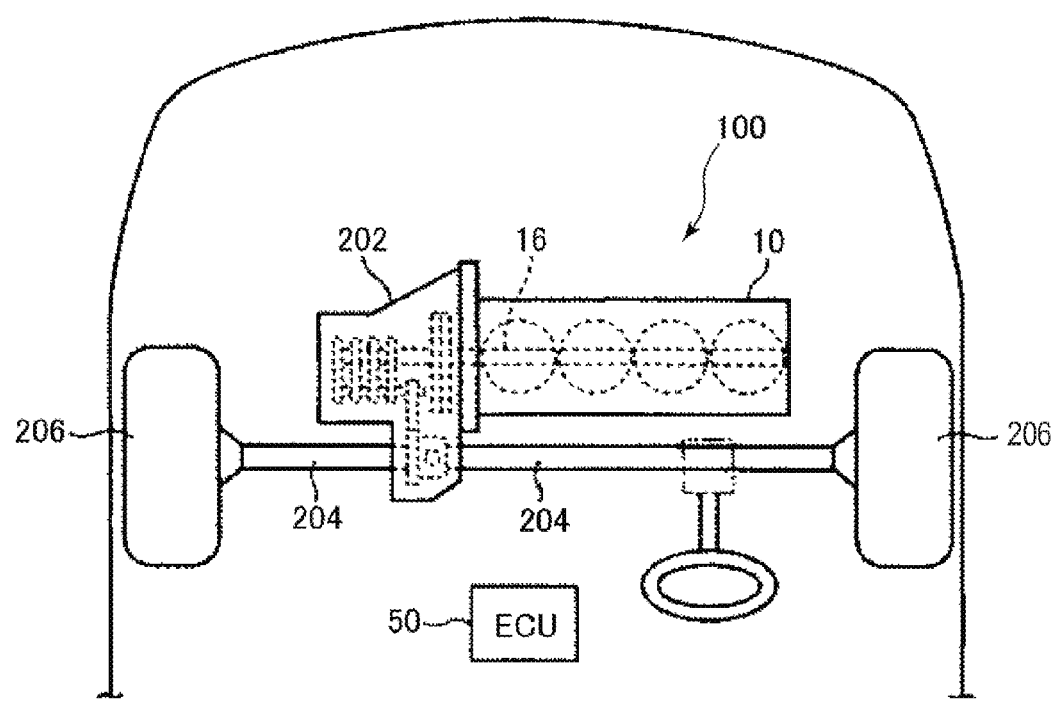
FIG. 1 is a plan view illustrating a schematic configuration of a vehicle to which a control device for an engine according to one embodiment of the present invention is applied.
Figure 2:
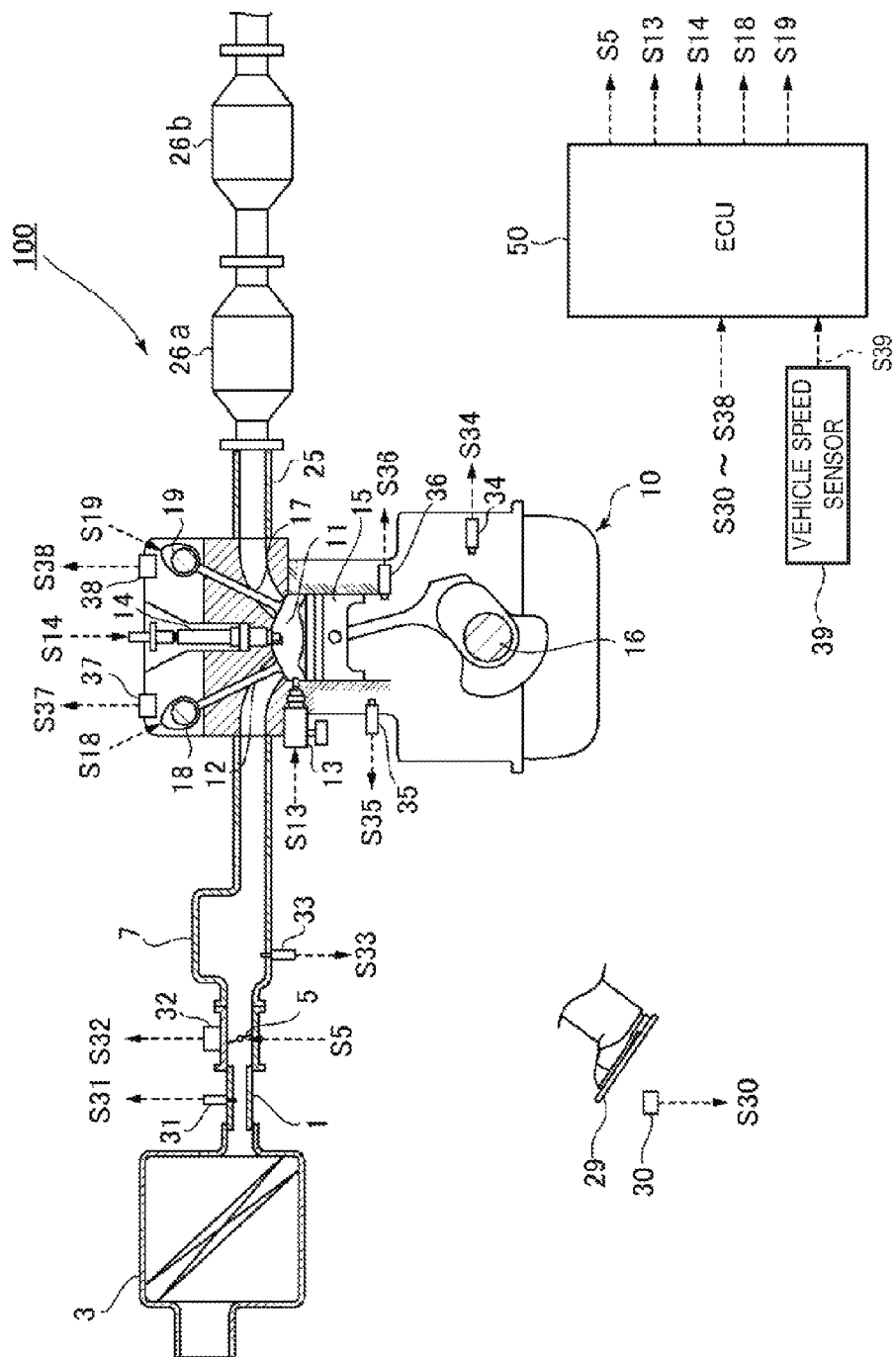
FIG. 2 is a view illustrating a schematic configuration of an engine system to which the control device for the engine according to the embodiment of the present invention is applied.

First, an engine system to which the control device for the engine of this embodiment is applied is described with reference to FIGS. 1 and 2. FIG. 1 is a plan view illustrating a schematic configuration of a vehicle to which the control device for the engine according to this embodiment is applied. FIG. 2 is a view illustrating a schematic configuration of the engine system to which the control device for the engine according to this embodiment is applied.

As illustrated in FIG. 1, in the vehicle, the engine 10 of the engine system 100 produces an engine torque (drive torque) as a thrust of the vehicle by causing combustion of a mixture gas containing fuel and air, and transfers the engine torque to a transmission 202 via a crankshaft 16. The transmission 202 changes a gear position among a plurality of positions (e.g., first to sixth ranges), and at a gear position set by the transmission 202, the engine torque from the engine 10 is transferred, via a pair of drive shafts 204, to a pair of wheels 206 attached to outer end parts of the drive shafts 204 in vehicle width directions, respectively. For example, the transmission 202 is a manual transmission of which gear position is selected by a driver of the vehicle at the driver's discretion. Further, the vehicle of this embodiment is a sports car, for example.

Further, in the vehicle, an ECU (Electronic Control Unit) 50 performs various controls within the vehicle. In this embodiment, the ECU 50 functions as the control device of the engine. According to operation of an accelerator pedal (accelerator) by the driver, the ECU 50 controls the engine torque which is outputted by the engine 10, and supplies the engine torque to the vehicle. Thus, a desired acceleration characteristic in relation to the accelerator operation can be achieved.

As illustrated in FIG. 2, the engine system 100 includes an intake passage 1 through which intake air (air) introduced from outside passes, the engine (specifically, a gasoline engine) 10 for producing a drive force of the vehicle by causing combustion of the mixture gas containing the intake air supplied from the intake passage 1 and the fuel supplied from a fuel injector 13 (described later), an exhaust passage 25 through which exhaust gas produced by the combustion within the engine 10 is discharged, sensors 30 to 39 for detecting various states regarding the engine system 100, and the ECU 50 for controlling the engine system 100 entirely.

The intake passage 1 is provided with, from its upstream side in the following order, an air cleaner 3 for purifying the intake air introduced from outside, a throttle valve 5 for adjusting an amount of intake air passing therethrough (intake air amount), and a surge tank 7 for temporarily storing the intake air to be supplied to the engine 10.

The engine 10 mainly includes an intake valve 12 for introducing, into a combustion chamber 11, the intake air supplied from the intake passage 1, the fuel injector 13 for injecting the fuel to the combustion chamber 11, an ignition plug 14 for igniting the mixture gas (containing the intake air and the fuel) supplied into the combustion chamber 11, a piston 15 for reciprocating due to the combustion of the mixture gas within the combustion chamber 11, the crankshaft 16 which is rotated in conjunction with the reciprocation of the piston 15, and an exhaust valve 17 for discharging, to the exhaust passage 25, the exhaust gas produced by the combustion of the mixture gas within the combustion chamber 11.

Moreover, the engine 10 varies operation timings of the intake and exhaust valves 12 and 17 (corresponding to phases of the valves) by a variable intake valve mechanism 18 and a variable exhaust valve mechanism 19 (both being a variable valve timing mechanism), respectively. Various known types may be applied for the variable intake valve mechanism 18 and the variable exhaust valve mechanism 19, and for example, an electromagnetic type mechanism or a hydraulic type mechanism may be used to change the operation timings of the intake and the exhaust valve 12 and 17.

The exhaust passage 25 is mainly provided with exhaust gas purifying catalysts 26a and 26b having a function of purifying the exhaust gas, such as an NOx catalyst, a three-way catalyst, or an oxidation catalyst. Hereinafter, when the exhaust gas purifying catalysts 26a and 26b are not differentiated, they may each simply be described as the "exhaust gas purifying catalyst 26."

Further, the engine system 100 is provided with the sensors 30 to 39 for detecting the various states regarding the engine system 100. The sensors 30 to 39 are specifically as follows: the accelerator opening sensor 30 for detecting a position of the accelerator pedal 29 (corresponding to an amount by which the driver depresses the accelerator pedal 29); the airflow sensor 31 for detecting the intake air amount corresponding to the flow rate of the intake air passing through the intake passage 1; the throttle opening sensor 32 for detecting an opening of the throttle valve 5 (throttle opening); the pressure sensor 33 for detecting intake manifold pressure corresponding to pressure of the intake air which is supplied to the engine 10; the crank angle sensor 34 for detecting a crank angle of the crankshaft 16; the water temperature sensor 35 for detecting a temperature of cooling water for cooling the engine 10 (water temperature); the temperature sensor 36 for detecting a temperature inside a cylinder of the engine 10 (in-cylinder temperature); the cam angle sensors 37 and 38 for detecting the operation timings (including close timings) of the intake and exhaust valves 12 and 17, respectively; and the vehicle speed sensor 39 for detecting the speed of the vehicle (vehicle speed). These various sensors 30 to 39 output respective detection signals S30 to S39 corresponding to the detected parameters, to the ECU 50.

The ECU 50 controls the components of the engine system 100 based on the detection signals S30 to S39 received from the various sensors 30 to 39 described above. Specifically, the ECU 50 supplies a control signal S5 to the throttle valve 5 to adjust open and close timings of the throttle valve 5 and the throttle opening, supplies a control signal S13 to each fuel injector 13 to adjust a fuel injection amount and a fuel injection timing, supplies a control signal S14 to each ignition plug 14 to adjust an ignition timing, and supplies control signals S18 and S19 to the variable intake valve mechanism 18 and the variable exhaust valve mechanism 19 to adjust the operation timings of the intake and exhaust valves 12 and 17, respectively.

Figure 3:
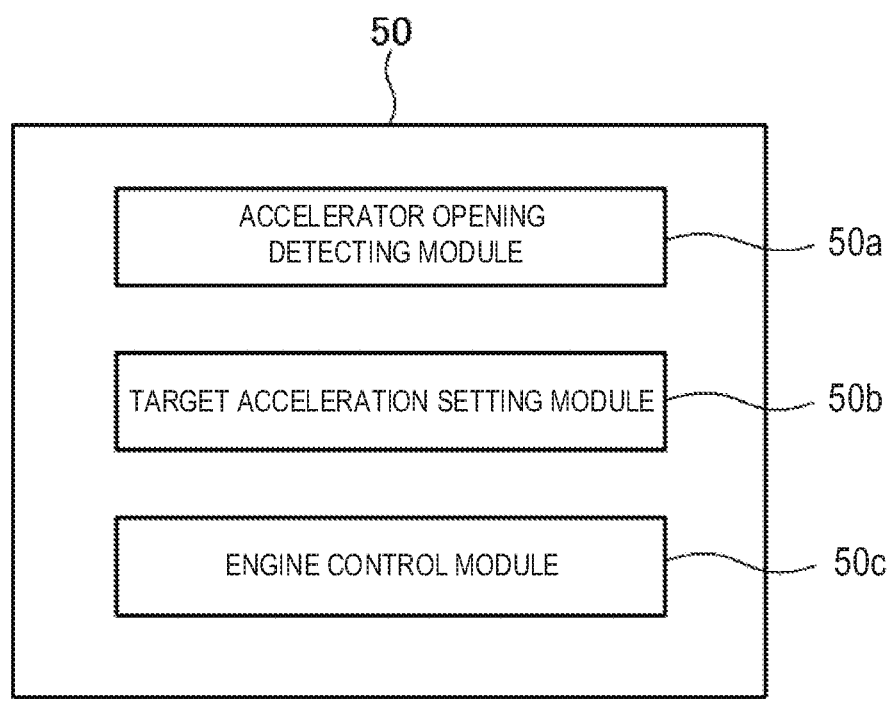
FIG. 3 is a block diagram illustrating a functional configuration of an ECU according to the embodiment of the present invention.

Next, a functional configuration of the ECU 50 of this embodiment is described with reference to FIG. 3. As illustrated in FIG. 3, the ECU 50 of this embodiment has at least one processor configured to execute an accelerator opening detecting module 50a (e.g., an accelerator opening detector), a target acceleration setting module 50b (e.g., a target acceleration setter), and an engine control module 50c (e.g., an engine controller).

The accelerator opening detecting module 50a acquires the accelerator opening (e.g., expressed in "%") based on the detection signal S30 outputted by the accelerator opening sensor 30.

The target acceleration setting module 50b sets a target acceleration of the vehicle based on the accelerator opening acquired by the accelerator opening detecting module 50a. Specifically, the target acceleration setting module 50b sets the target acceleration corresponding to the accelerator opening acquired by the accelerator opening detecting module 50a, by referring to a map in which the target acceleration to be set in relation to the accelerator opening is defined before use (hereinafter, referred to as the "acceleration characteristic map"). This acceleration characteristic map is defined for every predetermined vehicle speed and gear position.

The engine control module 50c adjusts the engine torque to achieve the target acceleration set by the target acceleration setting module 50b. Specifically, the engine control module 50c sets a target torque required for shifting an actual acceleration to the target acceleration, and controls the throttle valve 5 and/or the intake valve 12 through the variable intake valve mechanism 18, and additionally controls the fuel injector 13, etc., so as to cause the engine 10 to output the target torque.

Thus, the ECU 50 may be referred to as the "control device for the engine."

<Acceleration Characteristic>

Next, the acceleration characteristic which defines the target acceleration to be set in relation to the accelerator opening, which is applied in this embodiment, is described. In this embodiment, the acceleration characteristic in which the relationship between the accelerator opening and the target acceleration is defined is designed so that a desired jerk is produced in the vehicle when the driver depresses the accelerator pedal 29. First, the jerk to be produced when the driver depresses the accelerator pedal 29 in this embodiment is described with reference to FIGS. 4A to 4C.

Figure 4A:
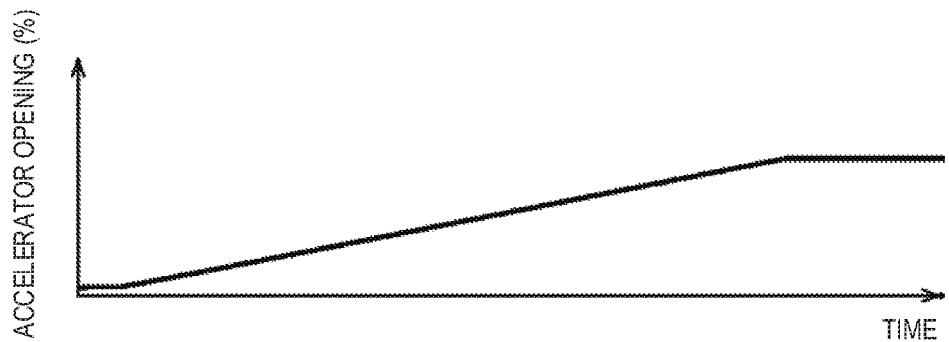
FIGS. 4A to 4C are diagrams illustrating a jerk to be produced when a driver depresses an accelerator pedal, according to the embodiment of the present invention.
Figure 4B:
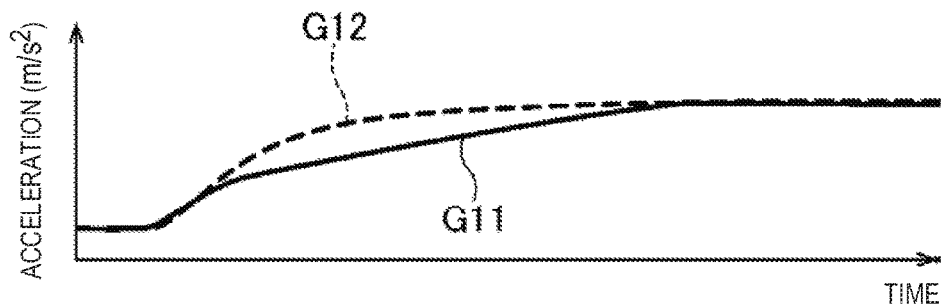
Figure 4C:
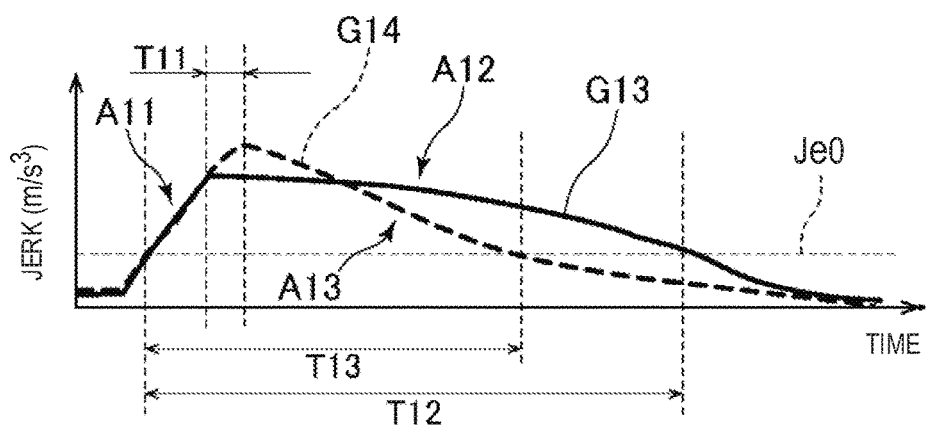

FIGS. 4A to 4C are diagrams illustrating the jerk to be produced in the vehicle during acceleration in this embodiment. Here, a jerk of a comparative example is given for comparison with the jerk of this embodiment. As illustrated in FIG. 4A, in this embodiment, when the driver depresses the accelerator pedal 29 at a fixed operational speed, the acceleration indicated by the chart G11 of FIG. 4B occurs, and the jerk indicated by the chart G13 of FIG. 4C is produced as well, whereas, in the comparative example, the acceleration indicated by the chart G12 of FIG. 4B occurs, and the jerk indicated by the chart G14 of FIG. 4C is produced as well. FIG. 4C further illustrates, with a reference character "Je0," a lowest value of jerk which the driver can generally feel (e.g., 1 m/s). Hereinafter, this lowest jerk is simply referred to as the "lowest perceivable jerk."

Note that here, a situation where the accelerator pedal 29 is depressed from a state where the target acceleration is set to zero, for example, a situation where the vehicle is accelerated after making a turn out from a state where the target acceleration is set to zero for the turn out, is considered. The state where the target acceleration is set to zero corresponds to a state where traveling resistance applied to the vehicle (including air resistance, road surface resistance, and resistance due to a road gradient) and the drive force supplied to the wheels are in balance.

As indicated in a portion of the arrow A11 of FIG. 4C, in this embodiment and the comparative example, the jerk is increased at a similar change rate corresponding to the depression of the accelerator pedal 29. However in this embodiment, the highest value of the jerk of the vehicle is set lower than the comparative example. In this manner, a period of time required for the jerk to reach the highest value is shortened in this embodiment compared to the comparative example (see the reference character T11). For example, in this embodiment, the jerk reaches the highest value in about 200 ms from the start of depression of the accelerator pedal 29. Thus, in this embodiment, by shortening the time period required for the jerk to reach the highest value, the quick acceleration feel, in other words, an impression that the vehicle has a quick response, can be provided to the driver. In addition, in this embodiment, the driver is left with an impression of a point (timing) at which the jerk reaches the highest value, so that the driver can quickly predict a level of acceleration of the vehicle based on this point.

Further, as indicated in portions of the arrows A12 and A13 of FIG. 4C, in this embodiment, the jerk is gently reduced after reaching the highest value, compared to the comparative example. More specifically, in this embodiment, the jerk is kept substantially at a fixed value and then gently reduced. Thus, in this embodiment, a period in which the jerk is above the lowest perceivable jerk Je0 described above is longer than the comparative example (see the reference characters T12 and T13). In this embodiment, the highest value of the jerk to be produced in the vehicle is reduced compared to the comparative example as described above so as to secure allowance of the engine output. Therefore, the period in which the jerk is above the lowest perceivable jerk Je0 can be extended. Thus, in this embodiment, a time range where the driver can feel the change of acceleration is extended by elongating the period in which the jerk is above the lowest perceivable jerk Je0, and a linear acceleration feel is secured (also see the chart G11 of FIG. 4B) by keeping the jerk substantially fixed over time.

As described above, in this embodiment, the acceleration characteristic in which the relationship between the accelerator opening and the target acceleration is defined is designed so that the jerk indicated by the chart G13 of FIG. 4C described above is produced in the vehicle when the accelerator pedal 29 is depressed (i.e., during acceleration). Specifically, the acceleration characteristic map which is used by the target acceleration setting module 50b of the ECU 50 described above is defined so that a mode of a characteristic indicating a relationship between the accelerator opening and the jerk (hereinafter, referred to as the "jerk characteristic") becomes similar to that in which the temporal change of the jerk indicated by the chart G13 is expressed in relation to the accelerator opening. The mode of the characteristic indicating the relationship between the accelerator opening and the jerk can be obtained by differentiating, with respect to time, the target acceleration defined in the acceleration characteristic.

Figure 5A:
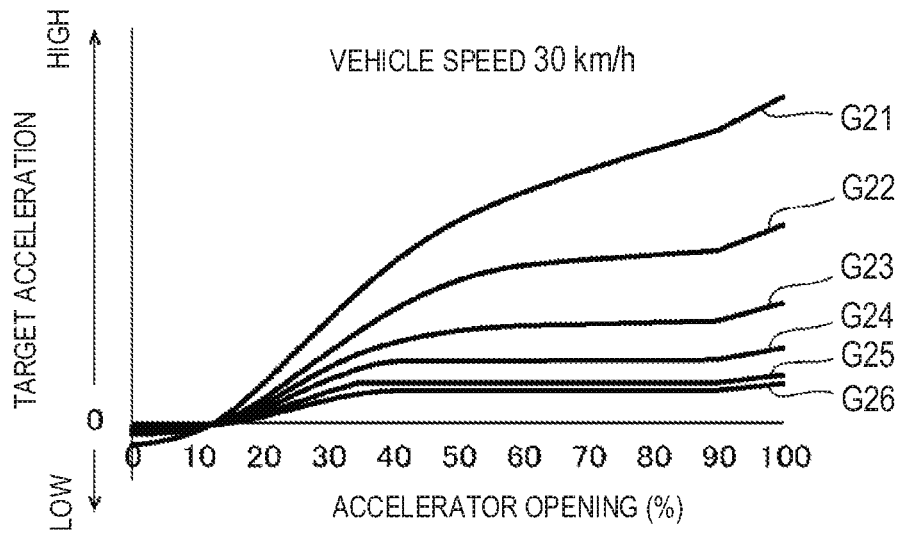
FIGS. 5A to 5C are charts illustrating one example of acceleration characteristic maps for predetermined vehicle speeds and gear positions, respectively, according to the embodiment of the present invention.
Figure 5B:
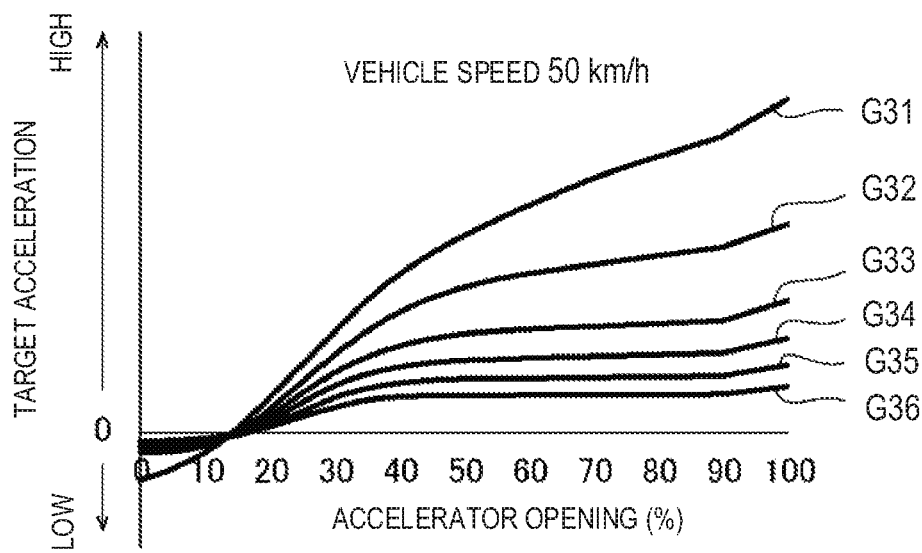
Figure 5C:
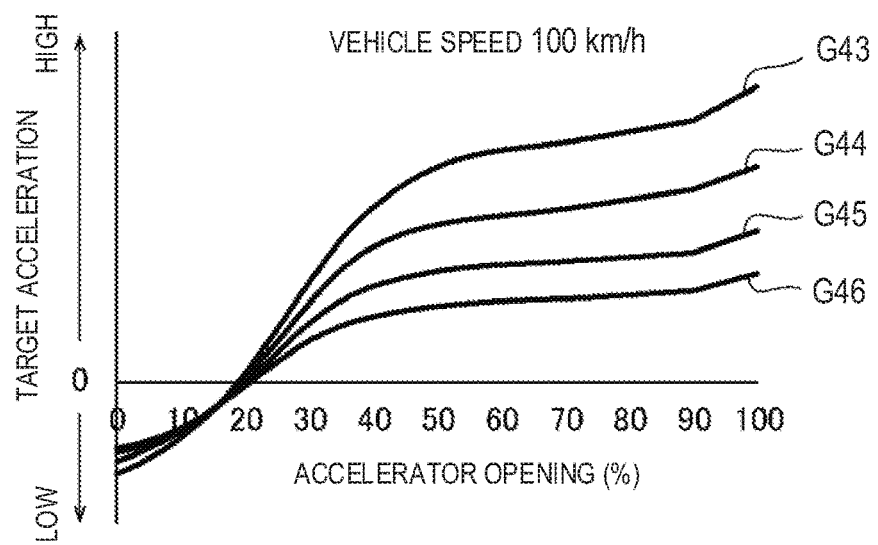

The acceleration characteristic map of this embodiment is described in detail with reference to FIGS. 5A to 5C. FIGS. 5A to 5C are charts illustrating one example of the acceleration characteristic maps for predetermined vehicle speeds and gear positions, respectively, according to this embodiment. In each of FIGS. 5A to 5C, the horizontal axis indicates the accelerator opening and the vertical axis indicates the target acceleration.

FIG. 5A illustrates acceleration characteristic maps applied at a vehicle speed of 30 km/h, FIG. 5B illustrates acceleration characteristic maps applied at a vehicle speed of 50 km/h, and FIG. 5C illustrates acceleration characteristic maps applied at a vehicle speed of 100 km/h. Further, the charts G21 to G26 of FIG. 5A indicate acceleration characteristic maps applied for the gear positions of the first to sixth ranges, respectively. The charts G31 to G36 of FIG. 5B indicate acceleration characteristic maps applied for the gear positions of the first to sixth ranges, respectively. The charts G43 to G46 of FIG. 5C indicate acceleration characteristic maps applied for the gear positions of the third to sixth ranges, respectively. As illustrated in FIGS. 5A to 5C, in each acceleration characteristic map, the target acceleration is set to zero when the accelerator opening is about 20%.

Note that although the acceleration characteristic maps applied at 30 km/h, 50 km/h, and 100 km/h are illustrated in FIGS. 5A to 5C as an example, practically, acceleration characteristic maps for various other vehicle speeds are also prepared. Further, in FIG. 5C, since the vehicle speed is comparatively high at 100 km/h and maps for low gear positions (first and second ranges) are usually not used at this vehicle speed, the illustration of these maps is omitted.

Figure 6A:
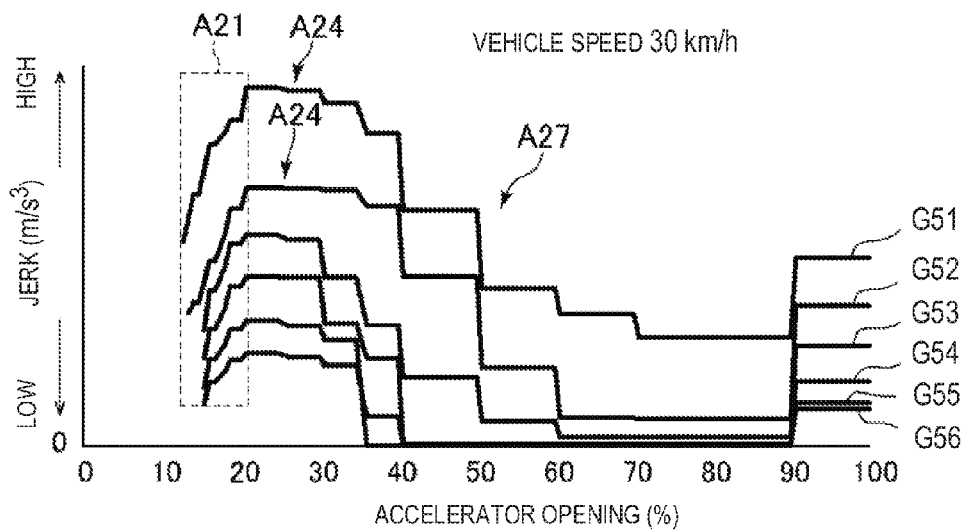
FIGS. 6A to 6C are charts illustrating one example of jerk characteristics obtained by differentiating, with respect to time, target accelerations defined in the respective acceleration characteristic maps, according to the embodiment of the present invention.
Figure 6B:
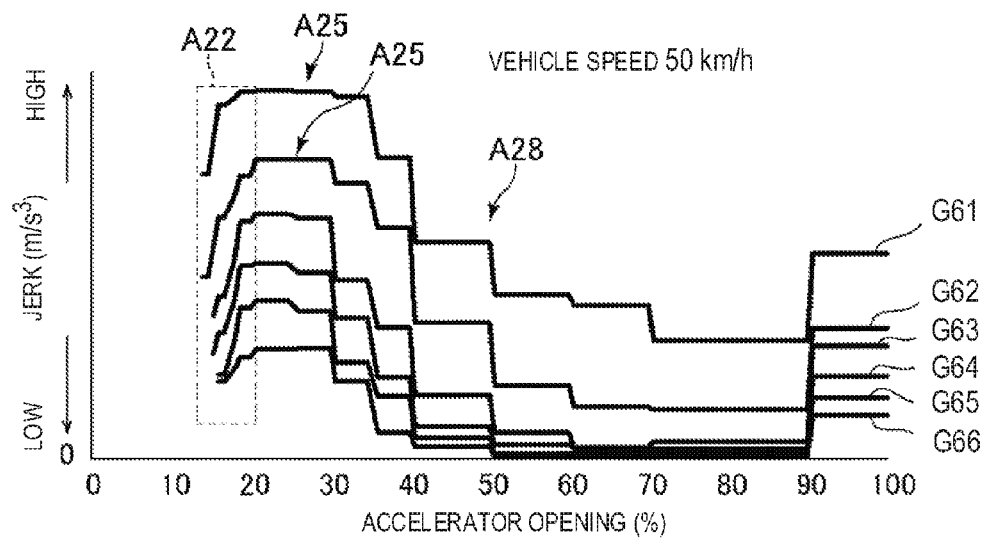
Figure 6C:
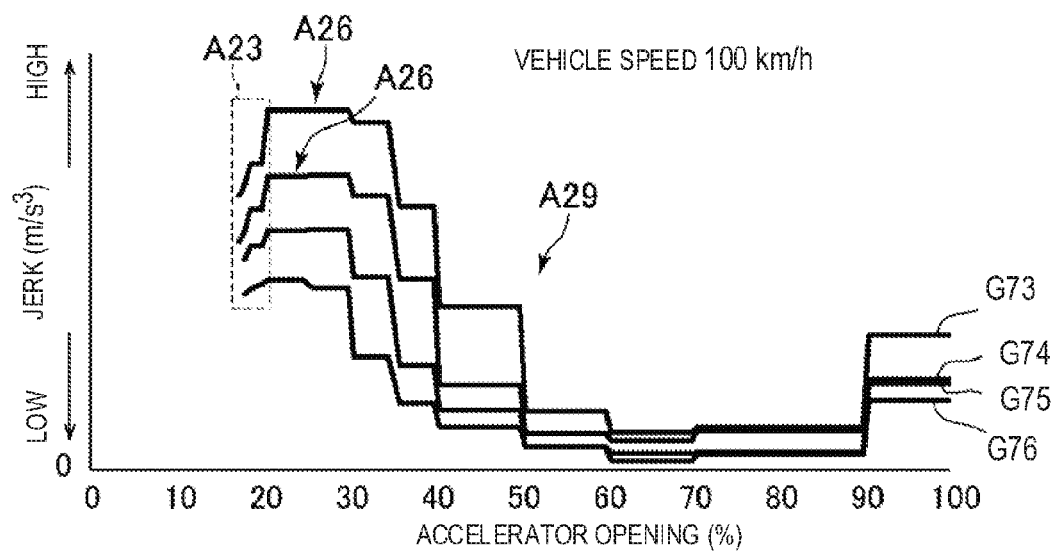

FIGS. 6A to 6C are charts illustrating one example of the jerk characteristics obtained by differentiating, with respect to time, the target accelerations defined in the respective acceleration characteristic maps, according to this embodiment. In each of FIGS. 6A to 6C, the horizontal axis indicates the accelerator opening and the vertical axis indicates the jerk.

FIG. 6A illustrates a jerk characteristic at the vehicle speed of 30 km/h, which is obtained by differentiating, with respect to time, the target acceleration defined in the acceleration characteristic map of FIG. 5A. FIG. 6B illustrates a jerk characteristic at the vehicle speed of 50 km/h, which is obtained by differentiating, with respect to time, the target acceleration defined in the acceleration characteristic map of FIG. 5B. FIG. 6C illustrates a jerk characteristic at the vehicle speed of 100 km/h, which is obtained by differentiating, with respect to time, the target acceleration defined in the acceleration characteristic map of FIG. 5C. Further, the charts G51 to G56 of FIG. 6A indicate jerk characteristics for the gear positions of the first to sixth ranges, respectively. The charts G61 to G66 of FIG. 6B indicate jerk characteristics for the gear positions of the first to sixth ranges, respectively. The charts G73 to G76 of FIG. 6C indicate jerk characteristics for the gear positions of the third to sixth ranges, respectively.

Note that although the jerk characteristics at 30 km/h, 50 km/h, and 100 km/h are illustrated in FIGS. 6A to 6C as an example, practically, jerk characteristics for various other vehicle speeds are also defined. Further, each of FIGS. 6A to 6C illustrates a change of the jerk within an accelerator opening range exceeding the opening at which the target acceleration is set to zero. In other words, in each of the charts G51 to G56, G61 to G66, and G73 to 76, the lowest value of the accelerator opening corresponds to the opening at which the target acceleration is set to zero. In addition, in FIG. 6C, since the vehicle speed is comparatively high at 100 km/h and jerk characteristics for low gear positions (first and second ranges) are usually not applied at this vehicle speed, the illustration of these characteristics is omitted.

As indicated in portions of the reference characters A21 to A23 in FIGS. 6A to 6C, in this embodiment, the jerk characteristic is defined in relation to the accelerator opening so that the highest jerk is produced in the vehicle when the accelerator opening is 5 to 10% larger than that at which the target acceleration is set to zero. Specifically, the acceleration characteristic map indicating the relationship between the accelerator opening and the target acceleration is designed so that when the accelerator opening is increased from the state where the target acceleration is set to zero, the highest jerk is produced in the vehicle when the accelerator opening is 5 to 10% larger than that at which the target acceleration is set to zero (e.g., between 18 and 21%). Thus, the jerk characteristic described above is achieved.

Further, as indicated in portions of the arrows A24 to 26 in FIGS. 6A to 6C, in this embodiment, the jerk characteristic in relation to the accelerator opening is defined so that the jerk is substantially fixed regardless of an increase of the accelerator opening within a predetermined range of the accelerator opening. The predetermined range is above the opening at which the highest jerk is produced in the vehicle. Actually, the acceleration characteristic map indicating the relationship between the accelerator opening and the target acceleration is designed so that the jerk is substantially fixed regardless of the increase of the accelerator opening within the predetermined range of the accelerator opening which exceeds the opening at which the highest jerk is produced in the vehicle. Thus, the jerk characteristic described above is achieved.

Note that the predetermined range of the accelerator opening within which the jerk is substantially fixed regardless of the increase of the accelerator opening varies depending on the value of the highest jerk to be produced in the vehicle. Specifically, the applied predetermined range of the accelerator opening becomes narrower as the highest jerk becomes higher.

Further, as indicated in portions of the arrows A27 to A29 in FIGS. 6A to 6C, in this embodiment, the jerk characteristic in relation to the accelerator opening is defined so that the jerk reduces as the accelerator opening increases above the predetermined range described above. More specifically, the jerk characteristic in relation to the accelerator opening is defined so that a change rate (absolute value) of the jerk when it reduces becomes gradually higher as the accelerator opening increases. Actually, the acceleration characteristic map indicating the relationship between the accelerator opening and the target acceleration is defined so that the jerk reduces as the accelerator opening increases above the predetermined range and the change rate of the reducing jerk becomes gradually higher as the accelerator opening increases. Thus, the jerk characteristic described above is achieved. For example, the jerk is reduced as the accelerator opening increases, based on a quadratic function defined based on the accelerator opening and the jerk.

Next, a specific method of determining the characteristic of the jerk to be produced in the vehicle according to the accelerator opening (jerk characteristic) in this embodiment is described with reference to FIGS. 7 to 9. Note that based on the determined jerk characteristic, the acceleration characteristic map for achieving this jerk characteristic is defined before use (see FIGS. 5A to 5C), and a target acceleration corresponding to an actual accelerator opening, the vehicle speed, and the gear position is set by referring to the acceleration characteristic map, and the engine torque is adjusted to achieve the target acceleration.

FIGS. 7A and 7B are diagrams illustrating a method of determining values of predetermined points (values of the accelerator opening and jerk) which define a mode of the jerk characteristic according to this embodiment. FIG. 7A illustrates the accelerator opening and the jerk in the horizontal axis and the vertical axis, respectively, and illustrates one example of the jerk characteristic of this embodiment. On the other hand, FIG. 7B illustrates the accelerator opening and the target acceleration in the horizontal axis and the vertical axis, respectively, and illustrates one example of the acceleration characteristic of this embodiment.

As illustrated in FIG. 7A, the mode of the jerk characteristic is defined by values at points P11 to P14. The point P11 is a point corresponding to the accelerator opening at which the target acceleration becomes zero, the point P12 is a point where the highest jerk is produced, the point P13 is a point at which the jerk will no longer be kept substantially at the highest jerk, in other words, the jerk kept substantially at the highest jerk starts being reduced, and the point P14 is a point at which the reducing jerk reaches the lowest perceivable jerk Je0. Hereinafter, the accelerator opening and jerk corresponding to the point P11 are denoted with "Ac1" and "Je1," respectively, the accelerator opening and jerk corresponding to the point P12 are denoted with "Ac2" and "Je2," respectively, the accelerator opening and jerk corresponding to the point P13 are denoted with "Ac3" and "Je3," respectively, and the accelerator opening and jerk corresponding to the point P14 are denoted with "Ac4" and "Je4," respectively. Further, in the acceleration characteristic illustrated in FIG. 7B, the points P21 to P24 correspond to the points P11 to P14 of the jerk characteristic illustrated in FIG. 7A, respectively.

Hereinafter, a method of determining the accelerator openings Ac1 to Ac4 and the jerks Je1 to Je4 at the respective points P11 to P14 is described in detail.

First, an acceleration when the accelerator opening is fully opened (hereinafter, referred to as the "highest acceleration") is obtained according to the operating state of the engine 10 (e.g., an engine speed and a set gear position) at the point P11 at which the target acceleration is set to zero, and the jerk Je2 at the point P12 (highest jerk) is determined based on the highest acceleration. Basically, the highest jerk Je2 of a larger value is determined as the highest acceleration is higher.

Note that the highest jerk Je2 is preferably a value with which an engine output required to keep the jerk above the lowest perceivable jerk Je0 for a certain period of time after reaching the highest jerk Je2, can be secured at the timing that the jerk reaches the highest jerk Je2. In other words, the highest jerk Je2 is preferably determined so that an engine output required to keep the jerk with which the linear acceleration feel can be obtained after the jerk reaches the highest jerk Je2 is secured at the timing that the jerk reaches the highest jerk Je2.

Next, a timing of producing the highest jerk Je2 (specifically, a period of time from the start of depression of the accelerator pedal 29 in the state where the target acceleration is set to zero, until the highest jerk Je2 is produced) is determined based on the highest jerk Je2 determined as above and the vehicle speed. Basically, the time period is determined to be shorter (i.e., the timing of producing the highest jerk Je2 is determined to be earlier) as the highest jerk Je2 is lower and the vehicle speed is higher. For example, the timing of producing the highest jerk Je2 is determined to be within a time range between 170 and 300 ms. Next, the jerk Je1 at the point P11 is determined based on the highest jerk Je2 and the timing of producing the highest jerk Je2. Basically, the jerk Je1 of a smaller value is determined as the timing of producing the highest jerk Je2 is later. For example, a ratio of the jerk Je1 with respect to the highest jerk Je2 (e.g., between 70 and 90%) is determined and the jerk Je1 is obtained based on the ratio.

On the other hand, as for the accelerator opening Ac1 at the point P11 (i.e., the accelerator opening Ac1 at which the target acceleration is set to zero), for example, an accelerator opening corresponding to an angle of an ankle of the driver which minimizes a load applied to the leg muscles of the driver when operating the accelerator is applied. Further, the accelerator opening Ac2 at the point P12 (i.e., the accelerator opening Ac2 at which the highest jerk Je2 is produced) is determined based on the accelerator opening Ac1 at the point P11 and the timing of producing the highest jerk Je2 described above. Specifically, the accelerator opening Ac2 at the point P12 is obtained by adding, to the accelerator opening Ac1 at the point P11, a value obtained by converting the timing of producing the highest jerk Je2 into the accelerator opening.

Next, the time period for which the highest jerk Je2 is maintained is determined based on the highest jerk Je2 and the highest acceleration. Basically, the time period for which the highest jerk Je2 is maintained is determined to be shorter as the highest jerk Je2 is higher and the highest acceleration is lower. For example, the time period for which the highest jerk Je2 is maintained is determined to be within a time range between 100 and 350 ms.

Note that the reason why the time period for which the highest jerk Je2 is maintained is determined to be shorter as the highest jerk Je2 is higher is as follows. If the time period for which the highest jerk Je2 is maintained is determined to be longer when the highest jerk Je2 is high, the acceleration at the timing that the maintaining of the highest jerk Je2 ends tends to reach close to a target acceleration to be set finally. Therefore, after the maintaining of the highest jerk Je2 ends, the jerk Je2 cannot be reduced gently, but needs to be reduced sharply (in this case, the period in which the jerk is above the lowest perceivable jerk Je0 becomes short), and the linear acceleration feel cannot suitably be secured. For this reason, in this embodiment, the time period for which the highest jerk Je2 is maintained is determined to be shorter as the highest jerk Je2 is higher.

The accelerator opening Ac3 at the point P13 (i.e., the accelerator opening Ac3 at the point P13 at which the jerk will no longer be kept substantially at the highest jerk Je2) is determined based on the time period for which the highest jerk Je2 is maintained, which is determined as above. Specifically, the accelerator opening Ac3 at the point P13 is obtained by adding to the accelerator opening Ac2 at the point P12, a value obtained by converting the time period for which the highest jerk Je2 is maintained into the accelerator opening. Note that the highest jerk Je2 at the point P12 is applied as it is to be the jerk Je3 at the point P13.

Next, a method of determining the accelerator opening Ac4 and the jerk Je4 at the point P14 in this embodiment is described with reference to FIG. 8. In FIG. 8, the horizontal axis indicates the accelerator opening and the vertical axis indicates the jerk.

Figure 8:
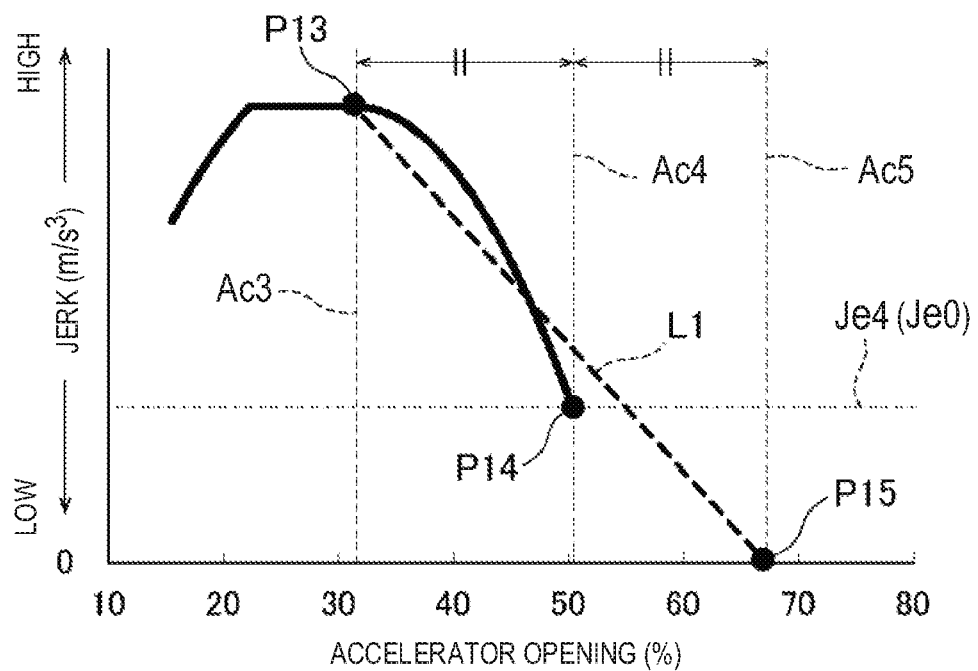
FIG. 8 is a diagram illustrating a method of determining an accelerator opening and a jerk at a point P14 of FIG. 7A, according to the embodiment of the present invention.

As illustrated in FIG. 8, a point P15 defined based on the accelerator opening at which the jerk becomes zero is first determined (hereinafter, the accelerator opening at the point P15 is denoted with "Ac5"). The accelerator opening Ac5 at the point P15 corresponds to an accelerator opening at which the depression of the accelerator pedal 29 for acceleration from the state where the target acceleration is zero ends, in other words, an accelerator opening for achieving the target acceleration to be set in the end. Such an accelerator opening Ac5 can be determined based on the highest acceleration described above, and basically, the accelerator opening Ac5 of a larger value is determined as the highest acceleration is higher. For example, the accelerator opening Ac5 is determined within a range between 30 and 80%. When the jerk is linearly reduced from the point P13 described above to the point P15 so as to reach zero at the point P15 which corresponds to the accelerator opening Ac5, this reduction can be expressed as the segment L1 in FIG. 8.

In this embodiment, an accelerator opening corresponding to a median of the accelerator opening Ac5 at the point P15 and the accelerator opening Ac3 at the point P13 is determined as the accelerator opening Ac4 at the point P14 (Ac4=(Ac3+Ac5)/2). Further, as described above, the lowest perceivable jerk Je0 is applied to be the jerk Je4 at the point P14. In this case, since the lowest perceivable jerk Je0, which is the lowest value of jerk which the driver can generally feel, varies according to the highest acceleration, the jerk Je4 at the point P14 is determined based on the highest acceleration. Specifically, since the lowest perceivable jerk Je0 becomes higher as the highest acceleration is higher (i.e., it becomes more difficult for the driver to feel a low jerk as the highest acceleration is higher), the jerk Je4 of a larger value is determined as the highest acceleration is higher. For example, the jerk Je4 is determined within a range between 0.5 and 3 m/s$^3$.

Note that the accelerator opening Ac4 at the point P14 is not limited to being the median of the accelerator opening Ac5 at the point P15 and the accelerator opening Ac3 at the point P13, and it may be a value obtained by correcting the median. Specifically, when a difference between the acceleration at the point P13 and the final target acceleration is large, since the jerk can be reduced more gently, the accelerator opening Ac4 at the point P14 may be corrected to a larger value than the median.

Next, a method of determining a curve connecting the point P11 to the point P12 and a curve connecting the point P13 to the point P14 is described with reference to FIG. 9. In FIG. 9, the horizontal axis indicates time and the vertical axis indicates the jerk. The time in the horizontal axis is obtained by converting the accelerator opening into time. Here, a method of determining a curve constituting a mode of a jerk characteristic expressed with the time instead of the accelerator opening is described.

Figure 9:
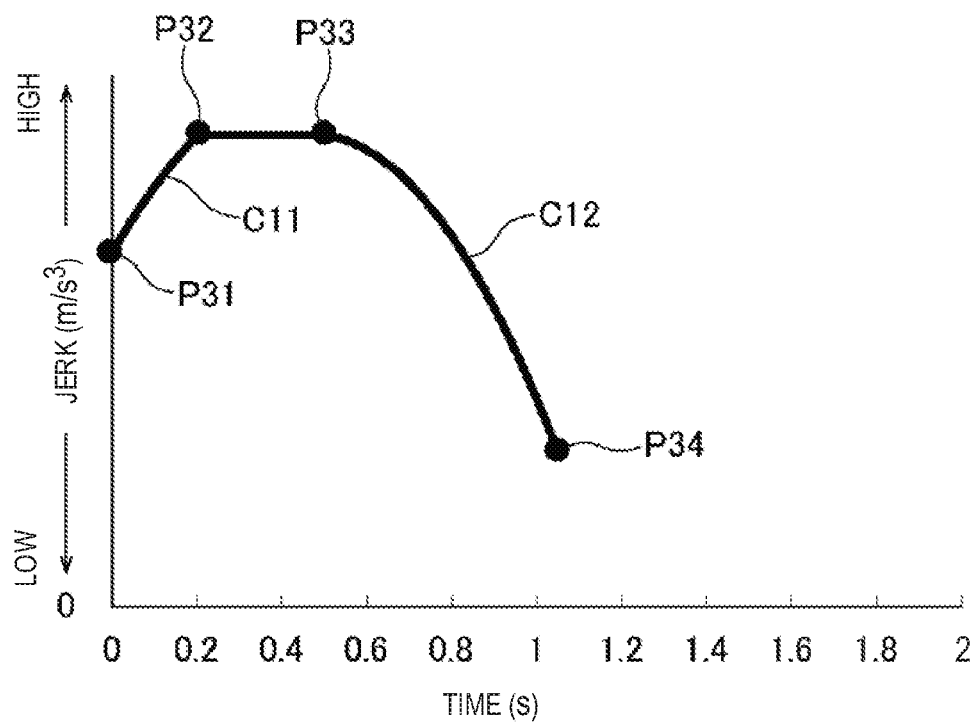
FIG. 9 is a diagram illustrating a method of determining a curve connecting a point P11 to a point P12 of FIG. 7A and a curve connecting a point P13 to the point P14 of FIG. 7A, according to the embodiment of the present invention.

Points P31 to P34 illustrated in FIG. 9 correspond to the above-described points P11 to P14 of which the accelerator opening is converted into time, respectively. Hereinafter, the time corresponding to the point P31 is denoted with "t1," the time corresponding to the point P32 is denoted with "t2," the time corresponding to the point P33 is denoted with "t3," and the time corresponding to the point P34 is denoted with "t4." The jerks corresponding to the points P31 to P34 are the above-described jerks Je1 to Je4, respectively.

First, a quadratic curve expressed by the following Equation 1 is applied for the curve C11 connecting the point P31 to the point P32.

$$Je = k_1 \times t^2 + k_2 \times t + k_3 \quad (1)$$

In Equation 1, "Je" indicates a jerk and "t" indicates time (both variables, which apply for below as well). Further, "$k_1$," "$k_2$," "$k_3$," indicate predetermined coefficients. A value based on the highest acceleration and the highest jerk is applied to the coefficient $k_1$. Specifically, the coefficient $k_1$ of a smaller value is applied as the highest acceleration is higher and the highest jerk is higher. For example, a value within a range between −5 and 0 is determined as the coefficient $k_1$. A value obtained by the following Equation 2 is applied to the coefficient $k_2$. The jerk Je1 at the point P31 is applied to the coefficient $k_3$.

$$k_2 = (-k_1 \times t1^2 + k_1 \times t2^2 + Je1 - Je2)/(t1-t2) \quad (2)$$

Next, a quadratic curve (specifically a parabola) expressed by the following Equation 3 is applied to a curve C12 connecting the point P33 to the point P34.

$$Je = k_4/(2 \times k_5^2) \times (t-t3) \times (t-t3) \quad (3)$$

In Equation 3, "$k_4$" and "$k_5$" indicate predetermined coefficients. Equation 3 is a simulation of an equation expressing a temporal change of a position of an object in a horizontally launched projectile motion. Therefore, a value "g" indicating a gravitational acceleration (9.80665) is applied to the coefficient $k_4$ as it is. Further, a value corresponding to an initial velocity used in the equation of the horizontally launched projectile motion is applied to the coefficient $k_5$. Specifically, a value obtained based on the following Equation 4 is applied to the coefficient $k_5$.

$$k_5 = \{g \times (t4-t3)^2/2(Je3-Je4)\}^{1/2} \quad (4)$$

In this embodiment, the jerk characteristic expressed with time, which is determined as above, is converted into a jerk characteristic expressed with the accelerator opening. In one example, when the accelerator operation is performed at an operational speed of 33.3%/s, the time may be converted into the accelerator opening by using an equation "t×33.3+Ac1." Further in this embodiment, when the jerk characteristic expressed with the accelerator opening is obtained by converting the time into the accelerator opening as above, the acceleration characteristic map in which the relationship between the accelerator opening and the target acceleration is defined is designed for every predetermined vehicle speed and gear position so as to achieve the obtained jerk characteristic (see FIGS. 5A to 5C).

By using one of the accelerator characteristic maps as above, when the accelerator pedal 29 is depressed (i.e., during acceleration), the target acceleration is set according to the accelerator opening and the engine torque is adjusted. Thus, the jerk indicated in the chart G13 of FIG. 4C is produced in the vehicle. Note that the mode of the temporal change of the jerk indicated in the chart G13 of FIG. 4C is, to be exact, different from the modes of the jerk characteristic obtained by converting the target acceleration in the acceleration characteristic map into the jerk, which are illustrated in FIGS. 6A to 6C. This difference occurs since the vehicle speed increases while the accelerator pedal 29 is depressed and the applied acceleration characteristic map thus sequentially changes corresponding to the increasing vehicle speed.

<Control>

Figure 10:
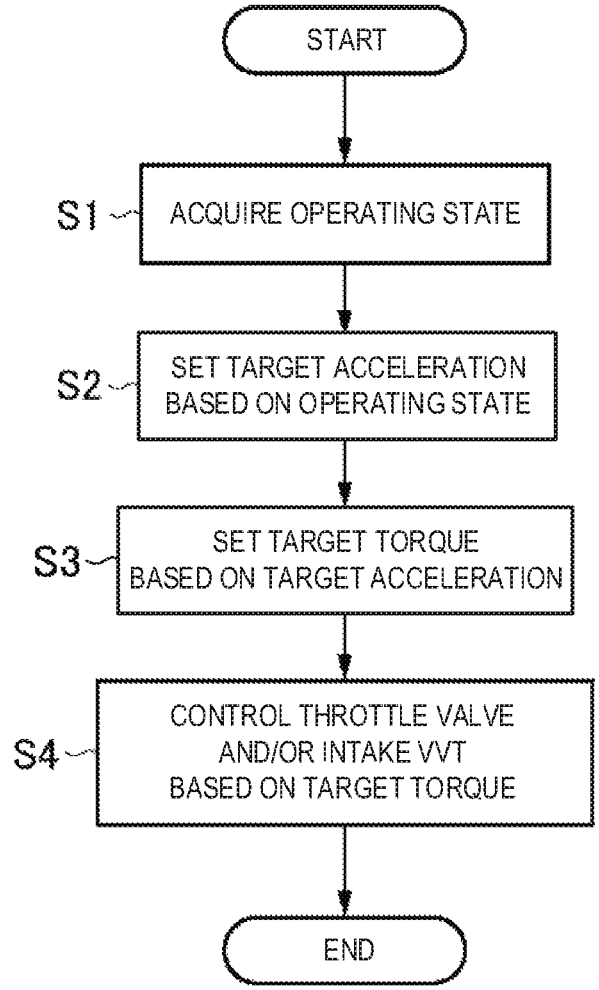
FIG. 10 is a flowchart illustrating an engine control according to the embodiment of the present invention.

Next, the engine control of this embodiment is described with reference to FIG. 10, which is a flowchart illustrating the engine control according to this embodiment. This flow is repeated in a predetermined time cycle by the ECU 50 of the engine system 100.

First at S1, the ECU 50 acquires an operating state of the vehicle. Specifically, the ECU 50 acquires, as the operating state of the vehicle, the accelerator opening detected by the accelerator opening sensor 30 (specifically, the accelerator opening acquired by the accelerator opening detecting module 50a of the ECU 50 based on the detection signal S30 outputted by the accelerator opening sensor 30), the vehicle speed detected by the vehicle speed sensor 39, the gear position currently set at the transmission 202, etc.

Next at S2, the target acceleration setting module 50b of the ECU 50 sets the target acceleration based on the accelerator opening, the vehicle speed, and the gear position acquired at S1. Specifically, the target acceleration setting module 50b selects an acceleration characteristic map corresponding to the current vehicle speed and the current gear position, from the acceleration characteristic maps defined for the various vehicle speeds and gear positions (the acceleration characteristic maps are created and stored in a memory or the like before use), such as those illustrated in FIGS. 5A to 5C. The target acceleration setting module 50b determines (sets) the target acceleration corresponding to the current accelerator opening by referring to the selected acceleration characteristic map.

Then, at S3, the engine control module 50c of the ECU 50 sets the target torque of the engine 10 so as to achieve the target acceleration set at S2. In this case, the engine control module 50c sets the target torque based on the current vehicle speed, etc., because when the vehicle speed increases, the traveling resistance becomes high, and therefore, the target torque needs to be set large. Moreover, the engine control module 50c sets the target torque within a range that the engine 10 can output.

Subsequently, at S4, the engine control module 50c controls the engine 10 to output the target torque set at S3. Specifically, the engine control module 50c adjusts the opening of the throttle valve 5 and/or the operation timing of the intake valve 12 through the variable intake valve mechanism 18 (intake variable valve timing (VVT) control) by taking into consideration the intake air amount detected by the airflow sensor 31, so that the air amount corresponding to the target torque is introduced into the engine 10. The engine control module 50c also controls the fuel injector 13 to inject the fuel injection amount determined based on the theoretical air-fuel ratio thereof with the air amount which corresponds to the target torque.

<Operations and Effects>

Next, operations and effects of the control device for the engine of this embodiment are described.

In this embodiment, when the accelerator opening is increased from the state where the target acceleration is set to zero, the target acceleration is set according to the accelerator opening so that the highest jerk is produced in the vehicle at the accelerator opening which is 5 to 10% larger than that at which the target acceleration is set to zero. Therefore, the time period for the jerk produced in the vehicle to reach the highest value is shortened, and the driver can be provided with the quick acceleration feel, in other words, the impression that the vehicle has a quick response. In addition, the driver can be left with an impression of a point (timing) at which the highest jerk is produced, and the driver can quickly predict a level of acceleration of the vehicle based on this point.

Further in this embodiment, when the accelerator opening is within the predetermined range exceeding the opening at which the highest jerk is produced in the vehicle, the jerk is substantially fixed regardless of the increase of the accelerator opening, and when the accelerator opening is above the predetermined range, the jerk is reduced as the accelerator opening increases. Thus, according to this embodiment, since the period in which time shifts while the jerk is substantially fixed over time, the period in which the jerk is above the lowest perceivable jerk Je0 is extended and the linear acceleration feel can suitably be secured and the time range where the driver can feel the change of acceleration can be extended.

Further, according to this embodiment, the predetermined range of the accelerator opening where the jerk is substantially fixed regardless of the increase of the accelerator opening is designed to be narrower as the highest jerk to be produced in the vehicle is higher. Therefore, the period in which the jerk is gently reduced after being kept substantially fixed can suitably be secured. Thus, the linear acceleration feel can effectively be secured.

Further, according to this embodiment, when the accelerator opening is above the predetermined range described above, the change rate (absolute value) of the jerk when it reduces is increased as the accelerator opening increases. Therefore, compared to the case of reducing the jerk in proportion to the increase of the accelerator opening (in this case, the change rate of the jerk when it reduces becomes a fixed value), the period in which the jerk is gently reduced can suitably be secured, in other words, a long period in which the jerk is above the lowest perceivable jerk Je0 can be secured. Thus, the linear acceleration feel can effectively be secured. Particularly in this embodiment, based on the quadratic function defined based on the accelerator opening and the jerk, the jerk is reduced as the accelerator opening increases. Thus, the linear acceleration feel can more effectively be secured.

<Modifications>

In the above embodiment, the present invention is applied to the engine 10 which is a gasoline engine (see FIG. 2); however, the present invention is not limited to being applied to a gasoline engine, and may similarly be applied to a diesel engine.

Further in this embodiment, based on the quadratic function, the jerk is reduced as the accelerator opening increases; however, it is not limited to using such a quadratic function, and various functions (e.g., exponential function and trigonometric function) may be used to reduce the jerk as the accelerator opening increases. In this case, a function based on which the jerk can gently be reduced compared to a configuration of linearly reducing the jerk may be applied.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

LIST OF REFERENCE CHARACTERS

1 Intake Passage
5 Throttle Valve
10 Engine
13 Fuel Injector
18 Variable Intake Valve Mechanism
25 Exhaust Passage
29 Accelerator Pedal (Accelerator)
30 Accelerator Opening Sensor
39 Vehicle Speed Sensor
50 ECU
50a Accelerator Opening Detecting Module
50b Target Acceleration Setting Module
50c Engine Control Module
100 Engine System

What is claimed is:

1. A control device for an engine, comprising:
a processor configured to execute:
an accelerator opening detector for detecting an opening of an accelerator;
a target acceleration setter for setting a target acceleration of a vehicle based on the accelerator opening detected by the accelerator opening detector; and
an engine controller for adjusting an engine torque to achieve the target acceleration set by the target acceleration setter,
wherein when the accelerator opening is increased from a state where the target acceleration is set to zero, the target acceleration setter sets the target acceleration according to the accelerator opening to produce a highest jerk in the vehicle at an accelerator opening that is larger by 5 to 10% than an accelerator opening corresponding to the state where the target acceleration is set to zero.

2. The control device of claim 1, wherein the target acceleration setter sets the target acceleration according to the accelerator opening such that the jerk is substantially fixed regardless of an increase of the accelerator opening within a predetermined range of the accelerator opening and the jerk reduces as the accelerator opening increases above the predetermined range, the predetermined range exceeding an accelerator opening at which the highest jerk is produced in the vehicle.

3. The control device of claim 2, wherein the predetermined range of the accelerator opening is set narrower as the highest jerk produced in the vehicle is higher.

4. The control device of claim 3, wherein when the accelerator opening is above the predetermined range, the target acceleration setter sets the target acceleration according to the accelerator opening so that a change rate of the jerk when the jerk is reducing becomes higher as the accelerator opening increases.

5. The control device of claim 4, wherein when the accelerator opening is above the predetermined range, the target acceleration setter sets the target acceleration according to the accelerator opening so that the jerk reduces as the accelerator opening increases, based on a quadratic function defined based on the accelerator opening and the jerk.

6. A control device for an engine, comprising:
a processor configured to execute:
an accelerator opening detector for detecting an opening of an accelerator;
a target acceleration setter for setting a target acceleration of a vehicle based on the accelerator opening detected by the accelerator opening detector; and
an engine controller for adjusting an engine torque to achieve the target acceleration set by the target acceleration setter,
wherein when the accelerator opening is increased from a state where the target acceleration is set to zero, the target acceleration setter sets the target acceleration according to the accelerator opening so that:
a jerk increases to a predetermined highest value at a first change rate as the accelerator opening increases;
the jerk is substantially fixed regardless of an increase of the accelerator opening within a predetermined range of the accelerator opening exceeding an accelerator opening at which the jerk reaches the highest value; and
the jerk reduces at a second change rate as the accelerator opening increases above the predetermined range, the second change rate being lower than the first change rate.

* * * * *